Dec. 18, 1962    B. ADINOFF ET AL    3,068,523
FOAM RUBBER APPARATUS
Filed April 8, 1958    2 Sheets-Sheet 1
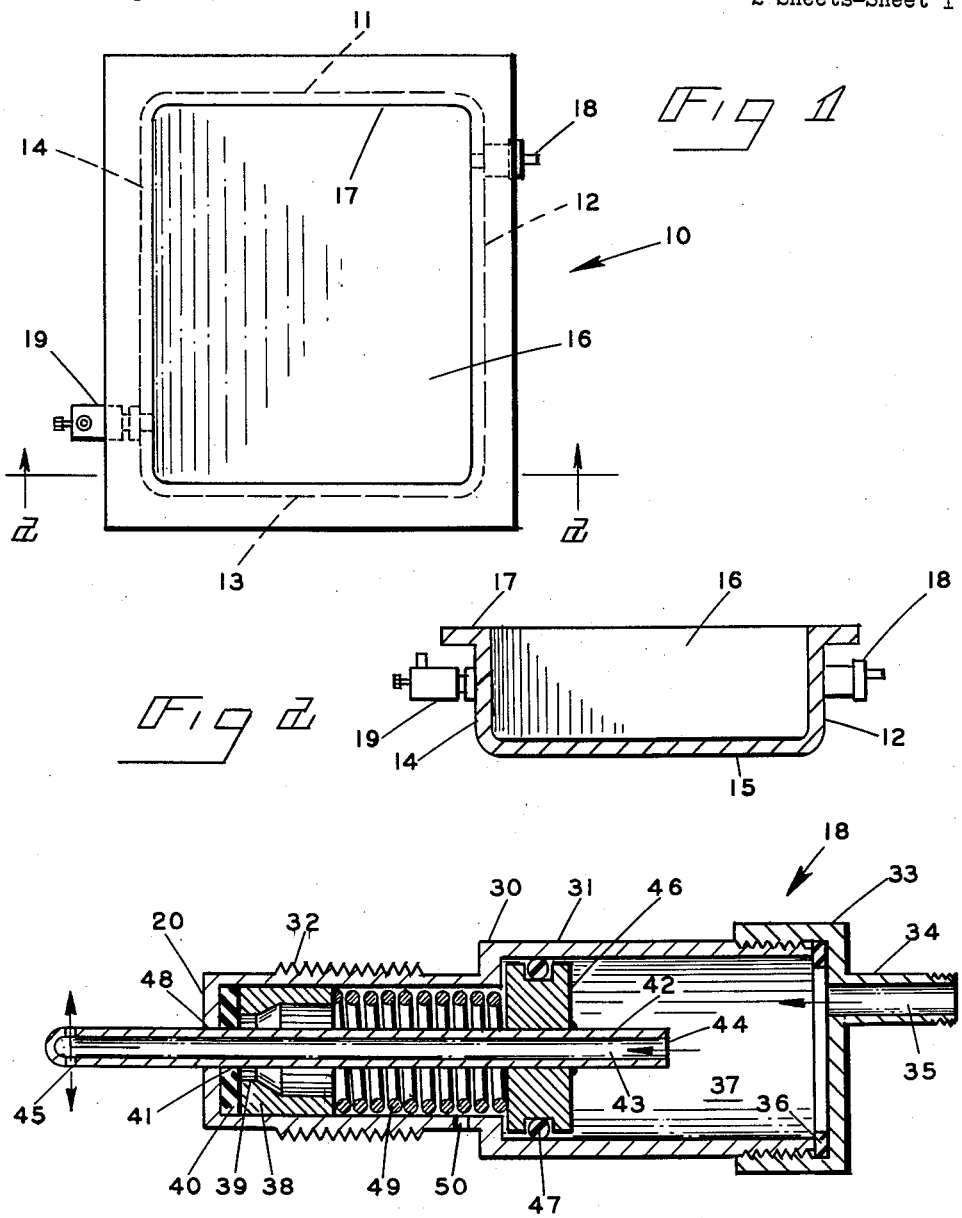
INVENTOR.
BERNARD ADINOFF
IVORY C. WILSON
BY
Reuben N Wolk
ATTORNEY Dec. 18, 1962  B. ADINOFF ET AL  3,068,523
FOAM RUBBER APPARATUS Filed April 8, 1958  2 Sheets-Sheet 2

INVENTOR.
BERNARD ADINOFF
IVORY C. WILSON
BY
Reuben Wolk
ATTORNEY

United States Patent Office 3,068,523
Patented Dec. 18, 1962

3,068,523
FOAM RUBBER APPARATUS
Bernard Adinoff, Dayton, Ohio, and Ivory C. Wilson, Waynesville, N.C., assignors, by direct and mesne assignments, of one-half to Dayco Corporation, a corporation of Ohio, and one-half to The B. F. Goodrich Company, a corporation of New York
Filed Apr. 8, 1958, Ser. No. 727,207
7 Claims. (Cl. 18—39)

This invention relates to an apparatus for manufacturing foam rubber products such as pillows, cushions, and mattresses. More specifically, it relates to molds wherein such products are formed, coagulated, and vulcanized in the desired shape, and to the introduction and removal of coagulating gas.

Foam rubber articles are generally made by providing a rubber latex froth and introducing it into a closed mold designed in the required shape. The rubber latex may be natural or any of the synthetics such as polychloroprene, butadiene-styrene copolymer, butadiene-acrylonitrile copolymer, or any combination of the above. In one commonly used method, such as described in the patent to Wolf, No. 2,138,081, the froth is produced by the use of hydrogen peroxide; if desired, mechanical agitation may be used. Regardless of the method used for frothing or foaming, the froth is frozen in the mold and coagulated or gelled to retain the reticulated cell structure which is established. This coagulation is preferably accomplished by the introduction of an appropriate gas into the mold which permeates these cells. After the coagulation step, the structure is vulcanized to form a permanent product.

It has been conventional practice to introduce coagulating gases through manually operated valves located in lines which are directly connected to the mold cavity. These valves are often rendered inoperative because some of the latex tends to enter them between cycles and solidifies. This requires frequent cleaning, and the attendant time loss makes for inefficient utilization of the apparatus. By means of the present invention, the coagulating gas may be introduced in such a way that the inlet means would not become clogged.

When the latex is frothed by one of the methods described above, oxygen becomes entrapped within the cells, and this oxygen must be removed to permit the coagulating gases to enter in its place. In the prior art methods, the oxygen is bled through small vents in the molds or through porous gaskets between the mold sections. These vents or gaskets also tend to clog and prevent operation at maximum efficiency. The present invention, therefore, also provides for a bleeder device that is not subject to such clogging. This device is capable of readily removing this oxygen, as well as any excess coagulating gas entering the mold.

As stated above, certain processes for the manufacture of foam rubber products cause oxygen entrapment in the cells. It is possible, however, to froth the latex by vacuum, or to apply vacuum to the molds after peroxide or mechanical steps. In either case, the cells are under at least a small amount of vacuum. It is also possible, if the time element is not critical, to allow a slow permeation of the coagulating gases into the cells and the dilution of these gases with oxygen. In such cases, the bleeder valve may be omitted or de-activated.

The present invention specifically contemplates the use of an automatic injector valve, as described herein, under any of the following circumstances:

(1) Automatic injection with no bleed.
(2) Automatic injection with conventional bleed such as gaskets or vent holes.
(3) Automatic injection accompanied by automatic bleed as described herein.

By means of the present automatic injector valve, the formation of unsightly gas holes in the finished product is eliminated. These holes are caused in prior art devices by the direct impingement of gas which tears away the frozen cells and leaves obvious holes. It is a specific object of this invention to avoid these defects.

Another object of this invention is to reduce the number of steam leaks occurring in the vulcanizing process. The steam present in the mold arises from the heating of water present in the froth, and performs the very useful function of keeping the gelled latex moist in the hot mold to prevent adhesion of the latex to the interior mold cavity surface. If the steam is absent in any section of the mold, the latex adheres to the cavity wall and will often tear when the molded product is stripped from the mold. The steam will leak out of the mold if either of the interior vent openings of the mold become clogged with solidified latex at the valves and prevents them from closing.

Another object of the invention is to lower gas costs since a lower factor of safety can be allowed for the amount of gas admitted to the mold. In prior art devices, it was common practice to keep the gas inlet line open much longer than needed for reaction to guard against the possibility of a clogged exhaust or inlet line, which if present would have affected the replacement of oxygen in the cells by coagulating gases, as described above.

A final object of the invention is to minimize the operator error during the admission of the gas due to the occasional failure of the operator to open or close a valve either timely or properly. A failure to pass sufficient gas into the foam will result in poor gelation which causes collapse of the froth. The present invention is adaptable to automatic operation and the direct labor of opening and closing valves can be eliminated. Such automation would reduce labor costs as well as eliminate human error during valve operation.

The above and other features of the present invention will be better understood from the following description when read in connection with the accompanying drawings showing a principal and a modified form of the invention.

FIGURE 1 is a plan view of a mold cavity for the manufacture of foam rubber cushions constructed in accordance with the principal method of carrying out the present invention.

FIGURE 2 is a sectional view taken along the line 2—2 of FIGURE 1.

FIGURE 3 is a sectional view of the gas injector valve shown in operating position.

Figure 4:
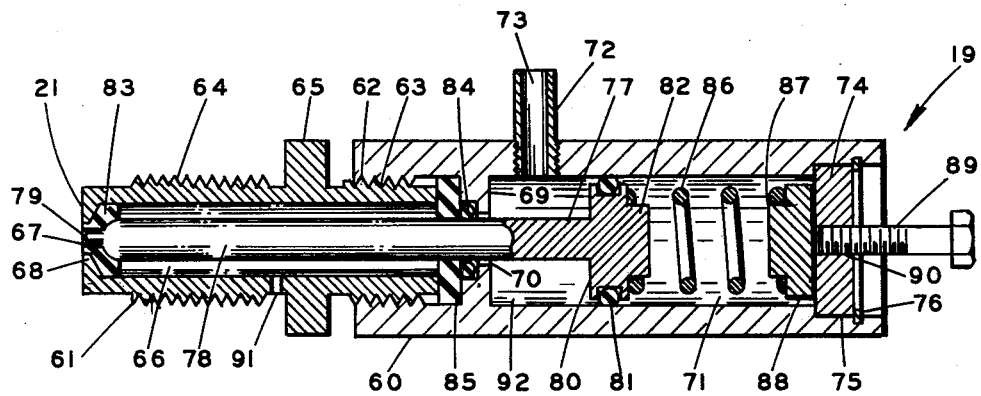
FIGURE 4 is a sectional view of the gas bleeder valve shown in FIGURE 1.

The apparatus shown in the above drawings can be adapted for those molds having covers containing core pins for the manufacture of hollowed-out foam products, as well as for those molds not containing such features. In the description of the structure and functions of the apparatus, the term "inner" refers to that portion of the structure closest to the interior of the mold cavity, and the term "outer" refers to that portion of the structure further removed from the interior of the mold cavity.

FIGURE 1 illustrates a typical lower mold section 10 consisting of walls 11, 12, 13 and 14 and a bottom surface 15, all defining a mold cavity 16. The sides are flanged and define an upper surface 17 which is adapted for mating with the upper mold section. The mold is preferably made of a metal such as steel or aluminum for the purpose of rapidly curing or freezing the foam therein. The injector valve 18 through which the gelating gas is introduced into the mold cavity is mounted in the side wall 12 of the mold. The bleeder valve 19 through which gas is passed from the pores of the frozen foam and through which excess coagulating gas is carried out of the mold is mounted in the side wall 14 of the mold. The inner faces 20 and 21 of the injector and bleeder valves, respectively, are flush with the mold cavity surface contour in order to minimize any visible indentations in the finished product. Such defects would otherwise arise after the froth has expanded to fill all crevices in the mold cavity, because of contact of such protruding members in the otherwise continuous surface of the foam. The correct inner faces of the valve ports may be obtained by grinding and polishing a valve that is in place in the mold. Although the valves have been shown to be located in the lower mold section they could, if desired, be located in the upper mold section.

As can be seen in FIGURES 1 and 2, the injector valve 18 is shown mounted flush against the inner mold cavity wall as described above, and about halfway down the mold wall 12. The bleeder valve 19 is located on the opposite wall 14 from that holding the injector valve and at approximately the same elevation in the mold. It is good practice to locate the injector and bleeder valves at opposite sides of the mold, to permit the gas to permeate every portion of the foam before it is exhausted.

*Description of the Injector Valve*

Referring to FIGURE 3, a preferred form of injector valve 18 is illustrated. The main housing of the valve is a cylindrical body 30 which is made of metal such as steel or aluminum. It is extremely important that the valve body does not freeze and thereby prevent proper operation since the entire mold cavity is subjected to temperatures below 32° F. to freeze the water present in the froth before the admission of the gas. It is also important that the material is one that does not corrode, since all moving parts must be capable of free movement within the valve body. The body has a larger diameter section 31 and a smaller diameter section 32, each having external threads. The section 32 is threaded into the mold half as shown in FIGURES 1 and 2, while the purpose of threads on the section 31 is to permit the assembly of a cap 33 thereupon. The cap terminates in an externally threaded pipe section 34 having an aperture 35 passing therethrough. The cap is tightly sealed against the valve body by means of a gasket 36 made of rubber, fiber, or other suitable material. The cap and the section 31 of the body thus define a chamber 37 within the body. Within the smaller section 32 of the body is located a guide bushing 38 which has been pressed into position. This bushing is concentric with the section 32, and has an aperture 39 therethrough. Mounted within the section 32, between the wall 20 and the inner surface of the guide bushing 38, is a sealing gasket 40 which is disk-shaped and has a central aperture 41. This gasket is made of a material having excellent resistance to weathering, temperature extremes, and chemical attack. Such a material may be fluorinated hydrocarbon or a compound of rubber and chlorosulfinated polyethylene.

Mounted within the body 30 is a piston and stem assembly capable of sliding movement in both directions. The stem 42 has an aperture 43 extending from one end 44 to just short of the other. This aperture is preferably very small in diameter, ranging from about .035 inch to .045 inch. The exact dimension may be varied to control the amount of gas capable of passing therethrough. At the closed end of the stem a plurality of exhaust ports 45 are provided at right angles to the axis of the stem. The exact number and diameter of these ports will also affect the amount of gas capable of passing into the mold. The ports are preferably of the same diameter as the stem aperture. A piston 46 is permanently attached to the stem by conventional means such as brazing. The piston has a groove in its outer surface in which is mounted a rubber O-ring seal 47 which fits tightly against the inner surface of the section 31 of the valve body to seal off the chamber 37 and to provide a bearing for the piston. The other bearing surface is provided by the aperture 48 in the end 20 of the valve body and the aperture 41 of the gasket 40, as the stem 42 passes through these apertures. A compression spring 49 is mounted between the end of the guide bushing 38 and the piston 46. A bleeder port 50 is drilled in the section 32 of the valve.

*Operation of the Injector Valve*

When the molding cycle has reached the point where it is desired to gel the frozen froth, the gas (usually carbon dioxide) is introduced automatically into all the pipes leading to the molds. The pipe section 34 will be tied into this system, enabling the gas to enter the chamber 37 of the valve body via aperture 35. The pipe section is preferably off center so that the gas entering the chamber will impinge directly upon a portion of the piston 46 rather than on an opening 44 of stem 42. The pressure forces the piston and stem assembly inward, thus causing the inner end of the stem to be free of the gasket 40 and protrude about one-half inch into the mold cavity. The piston will overcome the force exerted by spring 49 which normally keeps the piston and stem in the outermost position. The spring will be compressed as shown in FIGURE 3.

As soon as the initial inward movement begins, the open end 44 of the stem will no longer be in contact with the inner wall of cap 33, and some of the gas entering the chamber will be able to flow into the end 44, down the aperture 43, and will be discharged into the mold cavity through the newly-exposed discharge ports 45. The discharge is at right angles to the axis of the stem, thereby improving gas distribution and enabling the ports to be sealed off when no discharge occurs. The gas is being discharged at a pressure of about 10 pounds per square inch and a direct linear blast would create holes in the body. The present design results in the forming of a small hole only in the surface of the finished product, equal to the diameter of the stem.

The continued opertaion of the injector system depends upon a pressure differential between the two faces of the piston, with the higher pressure existing at the outer surface. The seal 47 is intended to prevent leakage from chamber 37 past the piston, but a small amount of leakage does actually take place due to a slight clearance between the seal and inner chamber wall necessary to allow piston movement. Such a leakage could tend to create a back pressure against the piston if some means were not provided to allow it to escape. For that reason, the bleeder port 50 is provided in the body to allow this gas to escape.

The amount of gas introduced into the system may be closely controlled to provide the proper gelling. As soon as this predetermined amount has been injected through the valve, the positive pressure upon piston 46 will cease and the spring 49 will no longer have this pressure to overcome; thus the spring will force the piston to return outward to the position it had prior to introduction of the gas. The piston stem 42 will, of course, also move to its normal position, or to the right as shown in FIGURE 3. The discharge ports 45 will then be covered by the sealing gasket 40. This prevents the latex from entering the ports 45 and coagulating in them, thus blocking them for subsequent operation.

*Construction of the Bleeder Valve*

Referring now to FIGURE 4, a preferred form of a bleeder valve 19 is illustrated as generally cylindrical in shape. The valve is composed primarily of members 60 and 61 made of a metal such as aluminum or steel. As was noted with respect to the injector valve, it is important that the valve not freeze, thereby preventing proper operation, although the entire mold cavity is subjected to freezing temperatures. It is also important that the material is not readily susceptible to corrosion, since free movement of all operating parts of the valve is essential. The body member 60 has internal threads 62 at its inner end, enabling the assembly of member 61 by means of its mating external threads 63 at the outer end. The member 61 also has external threads 64 at its inner end by which it may be mounted in the mold half 14 as shown in FIGURES 1 and 2. The external surface of the member 61 also has a hexagonal wrench flange 65 separating the threaded portions. The interior of member 61 has an aperture 66 extending throughout all of its length, but narrowed down at its inner end to a smaller opening 67, defined by shoulder 68. A vent hole 91 is located at right angles to the body, and passes into the aperture 66.

The interior surface of member 60 has a shoulder 69 near its inner end, this shoulder defining an aperture 70 which leads to the chamber defined by internal threads 62. The remaining portion of the interior forms a smooth aperture 71. Extending at right angles to the body 60 is a threaded pipe section 72 having an aperture 73 passnig into the aperture 71. The aperture 71 is sealed off at its outer surface by means of a plate 74 which is held in recess 75 of the body by means of metal retaining ring 76.

A piston assembly 77 provides a control for the amount of bleed and is mounted within the body members. The assembly consists of a cylindrical stem 78, tapering to a small end 79, and having an enlarged piston 80 at the other end in which is mounted a rubber O-ring seal 81 and having a shoulder 82 of smaller diameter. A gasket 83 is mounted in the inner end of the member 61, retained by shoulder 68, and is made of a material such as fluorinated hydrocarbon rubber. The end 79 of the valve stem fits tightly within the interior of the gasket, which is slightly smaller than the end in order to provide a fluid-tight seal and prevent the froth from the mold cavity from entering the valve. A rubber O-ring 84 is mounted in the shoulder 69 and a metal insert 85 is mounted between the ends of the assembled members 60 and 61. When the piston assembly is installed, it is slidable, yet sealed, by means of the O-rings 81 and 84 and the insert 85.

In order to maintain compression on the piston assembly, thus tending to keep it closed (as shown in FIGURE 4), a spring 86 is mounted between shoulder 82 and shoulder 87 of the plate 88 which abuts against the inner surface of plate 74. A bolt 89 is mounted in a threaded aperture 90 in the plate 74 and bears against the plate 88 so that rotation of the bolt will move the plate 88 inward and place added compression on the spring 86. Decrease in compression will be similarly effected by rotating the bolt in the opposite direction.

*Operation of the Bleeder Valve*

Again referring to FIGURE 4, the function of the bleeder valve 19 is to operate simultaneously with the opening of the injector valve 18 for the dual purpose of exhausting oxygen contained in the pores of the frozen foam and to remove excess coagulating gas from the mold cavity. The bleeder valve and the injector valve are interconnected in a parallel arrangement whereby gelling gas is introduced from a common supply to the inlet connections for both valves. The injector valve opens as already described in a preceding paragraph, while the gas enters the inlet pipe section 72 of the bleeder valve under a supply line pressure of about 40 pounds per square inch gauge. This gas fills the chamber 92 and creates a force acting upon the inner face of the piston 80 causing the piston assembly 77 to move outwardly (to the right). As a result, the spring 86 is compressed and the tapered end 79 of the stem breaks its seal with the opening 67 and the gasket 83 in the valve body member 61. The escaping oxygen or excess coagulating gas from the mold cavity enters the bleeder valve through the aperture created between the body opening and the tip of the stem, and is vented to the atmosphere through the vent hole 91. The O-ring seals 81 and 84, and insert 85 prevent the gas from leaking out of the chamber 92 into the aperture 66 of the valve body 61 and thence to the atmosphere. Upon closing the supply of gelling gas to the parallel system of the injector valve and the bleeder valve, the pressure in the gas chamber 92 of the bleeder valve is reduced by reverse gas flow through the injector valve and by gradual leakage of the gas into both adjoining chambers in the valve until the compression force of the spring 86 is sufficient to close the opening 67. During the intervening period between the closing of the gas supply to the valves and the closing of the bleeder valve aperture the pressure of the gelating gas in the mold cavity has been reduced until it reaches approximately atmospheric pressure. The compressive force exerted by the spring 86 can be varied by means of the adjusting bolt 89 as previously described to compensate for gas supply line pressure fluctuations. In this manner the bleeder valve will not close prematurely when the force on the piston 80 is lowered because of lower gas supply pressures.

*Modification*

Figure 5:
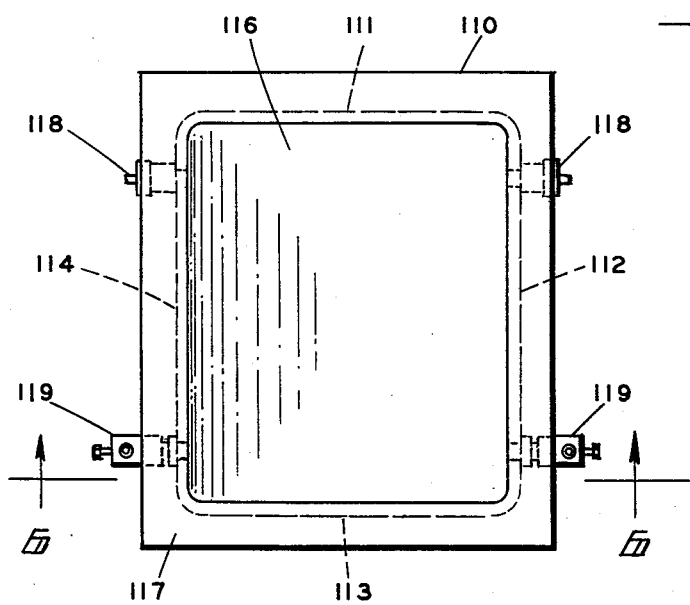
FIGURE 5 is a plan view of a mold cavity similar to that shown in FIGURE 1, illustrating a modified form of the invention.
Figure 6:
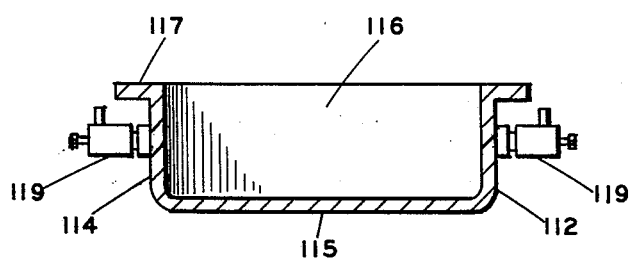
FIGURE 6 is a sectional view taken along the line 6—6 of FIGURE 5.

FIGURES 5 and 6 illustrate a modified form of the invention in which the number and location of the injector and bleeder valves are varied. It may be desirable to distribute the gelling gas to all portions of the mold as the lateral area of the mold cavity increases for larger finished products. As a result, multiple injector valves may be required to fill all portions uniformly while multiple bleeder valves may be necessary to vent the mold cavity uniformly and thereby prevent entrapment in any portion thereof. The lower mold half 110 consists of walls 111, 112, 113 and 114 and a bottom 115, all defining a mold cavity 116. The sides are flanged and define an upper surface 117 for mating with an upper mold half. The construction is similar to mold half 10 previously described. Two injector valves 118 are oppositely mounted in the walls 112 and 114, while two bleeder valves 119 are oppositely mounted in the same walls. Since the injector valves are diagonally across the mold cavity from the exhaust valves the "short circuit" effect is minimized; that is, the gas does not tend to exhaust before it has had an opportunity to expand to its maximum value. The valves 118 and 119 are affixed to the mold half in the same manner as described for FIGURE 1, and are of identical structure as valves 18 and 19 of the principal form of the invention.

Certain specific forms of the invention have been illustrated and described, but are intended to be specific examples only of devices for carrying out the principles of the invention. Other modifications may be made without departure from these principles.

We claim:

1. In an apparatus for manufacturing foam rubber products including a plurality of mold sections defining a cavity, an automatic gas bleed valve mounted in a wall of one of said sections comprising a generally cylindrical body having an opening at its inner end, and a member mounted in said body normally sealing said opening, said member axially slidable under external force to free said opening and permit gases to enter said valve from said cavity.

2. In an apparatus for manufacturing foam rubber products including a plurality of mold sections defining a cavity, an automatic gas bleed valve mounted in a wall of one of said sections comprising a generally cylindrical body having an opening at its inner end, said inner end flush with the inner surface of said wall, a centrally located stem and piston assembly axially slidable in said body, a spring mounted between said piston and the outer end of said body biasing said assembly inward and causing said stem to seal said opening, an inlet in said body through which gas may enter said valve, said gas forcing said assembly outward to free said opening and permit other gases to enter said valve from said cavity.

3. The apparatus of claim 2 in which the biasing effect of said spring is adjustable.

4. An apparatus for manufacturing foam rubber products including a plurality of mold sections having walls defining a cavity, a coagulating gas supply system, a pressure-actuated gas injection device in a wall of one of said sections and supplied by said system, and a gas bleed device in the opposite wall of said section, said gas bleed device actuated by a portion of the gases to permit said bleed device to remove entrapped gases from said mold.

5. The apparatus of claim 4 in which a portion of said injection device extends within said cavity when gas is supplied to said device.

6. The apparatus of claim 4 in which said injection device consists of a body and a member slidably mounted within said body, said slidable member extending within said cavity when gas is supplied to said device.

7. An apparatus for manufacturing foam rubber products including a plurality of mold sections having walls defining a cavity, a coagulating gas supply system, a plurality of gas injection devices mounted in opposite walls of one of said sections and supplied by said system, and a plurality of gas bleed devices mounted in said walls diagonally opposite said injection devices, said gas bleed devices actuated by a portion of the gases to permit said bleed devices to remove entrapped gases from said mold.

References Cited in the file of this patent

UNITED STATES PATENTS

| | | |
|---|---|---|
| 1,122,008 | Kramer | Dec. 22, 1914 |
| 1,898,325 | Venn | Feb. 21, 1933 |
| 2,290,510 | Talalay | July 21, 1942 |
| 2,470,717 | Palumbo | May 17, 1949 |
| 2,604,663 | Talalay | July 29, 1952 |
| 2,837,768 | Talalay | June 10, 1958 |
| 2,838,798 | Rekettye | June 17, 1958 |

FOREIGN PATENTS

| | | |
|---|---|---|
| 459,946 | Italy | Oct. 11, 1950 |